United States Patent [19]

Yoshigai

[11] 3,997,030
[45] Dec. 14, 1976

[54] AUTOMATIC BRAKE ADJUSTING DEVICE FOR BICYCLES

[75] Inventor: Kiyokazu Yoshigai, Osaka, Japan

[73] Assignee: Yoshigai Kikai Kinzoku Co., Ltd., Osaka, Japan

[22] Filed: Apr. 30, 1975

[21] Appl. No.: 573,167

[30] Foreign Application Priority Data

Nov. 28, 1974 Japan ............................ 49-138038

[52] U.S. Cl. ............................ 188/24; 188/196 BA
[51] Int. Cl.² ............................................. B62L 3/02
[58] Field of Search ............. 188/2 D, 24, 196 BA; 74/489, 501

[56] References Cited
UNITED STATES PATENTS

2,466,363  4/1949  Bodinaux et al. ............ 188/2 D X
3,759,352  9/1973  Toplis ................................. 188/24

*Primary Examiner*—Duane A. Reger
*Attorney, Agent, or Firm*—Stewart and Kolasch, Ltd.

[57] ABSTRACT

The present invention relates to a device for use with a bicycle brake system consisting of brake means including a housing secured to a handle bar, and a brake operating lever grippably secured to said housing; brake means for braking a wheel; and a Bowden cable for transmitting a gripping force on the brake operating lever in a direction in which the brake means acts to apply the brakes, said Bowden cable consisting of an inner cable and an outer sheath which operatively interconnect the brake means and the brake operating means, said device being arranged so that when gripping the brake operating lever to a predetermined extent fails to fully exert the intended braking action due, for example, to wear of the brake shoes and/or elongation of the Bowden cable, such decrease in or lack of the braking action is automatically compensated by utilizing the gripping action on the brake operating lever. The automatic adjusting device described above is substantially installed in the brake operating means.

15 Claims, 10 Drawing Figures

AUTOMATIC BRAKE ADJUSTING DEVICE FOR BICYCLES

BACKGROUND OF THE INVENTION

The present invention relates to an automatic adjusting device for bicycle brakes.

Heretofore, adjusting means to cope with events of the intended braking force being decreased due to wear of the brake shoes and/or elongation of the Bowden cable have been embodied by increasing the pulling force on the inner cable of the Bowden cable or the pushing force on the outer sheath thereof at the end of the Bowden cable on the brake side or brake operation side. The conventional adjusting means, however, are designed to be activated by manual or intentional operation on the adjusting member. Not only is the adjustment thereof very troublesome, but also it is difficult to obtain the proper mount of adjustment. Besides this, it sometimes occurs that the position of the brake operating lever is changed after adjustment, thereby adversely affecting the rider's attitude when he grips it. When the traction force on the inner cable of the Bowden cable is to be increased, as an example, by the adjusting means, it is necessary to pull the inner cable with a corresponding high strength. In the case of a brake consisting of a combination of large and small arches as in a side pull type caliper brake, however, since these arches are maintained in their opened or expanded condition by means of a spring, the large and small arches must be contracted against the force of the spring at the time of adjustment. It is, therefore, almost impossible to strongly pull the inner cable. This is the present situation, which is very serious from the standpoint of safety.

SUMMARY OF THE INVENTION

An object of the present invention is to provide an automatic brake adjusting device for bicycles whereby a decrease in the braking force, which has heretofore been exclusively manually compensated, can be automatically compensated through the intermediary of the operation of the brake operating lever which is necessarily performed by the rider.

Another object of the present invention is to provide a device wherein by installing the means for automatically compensating for a decrease in the braking force in the brake operating means, the proper amount of automatic adjustment is ensured irrespective of the type of the brake.

It is also an object of the present invention to provide a device designed so that after a decrease in the braking force has been automatically compensated, the brake operating lever is returned to its initial position, thereby ensuring that the brake operating lever will be held in its optimum position at all times.

Finally, an object of the present invention is to provide a device which is simple in construction and easy to apply.

These and other objects, features and merits of the present invention will appear as the description proceeds, when taken in conjunction with the accompanying drawings illustrating embodiments of the present invention by way of example only.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
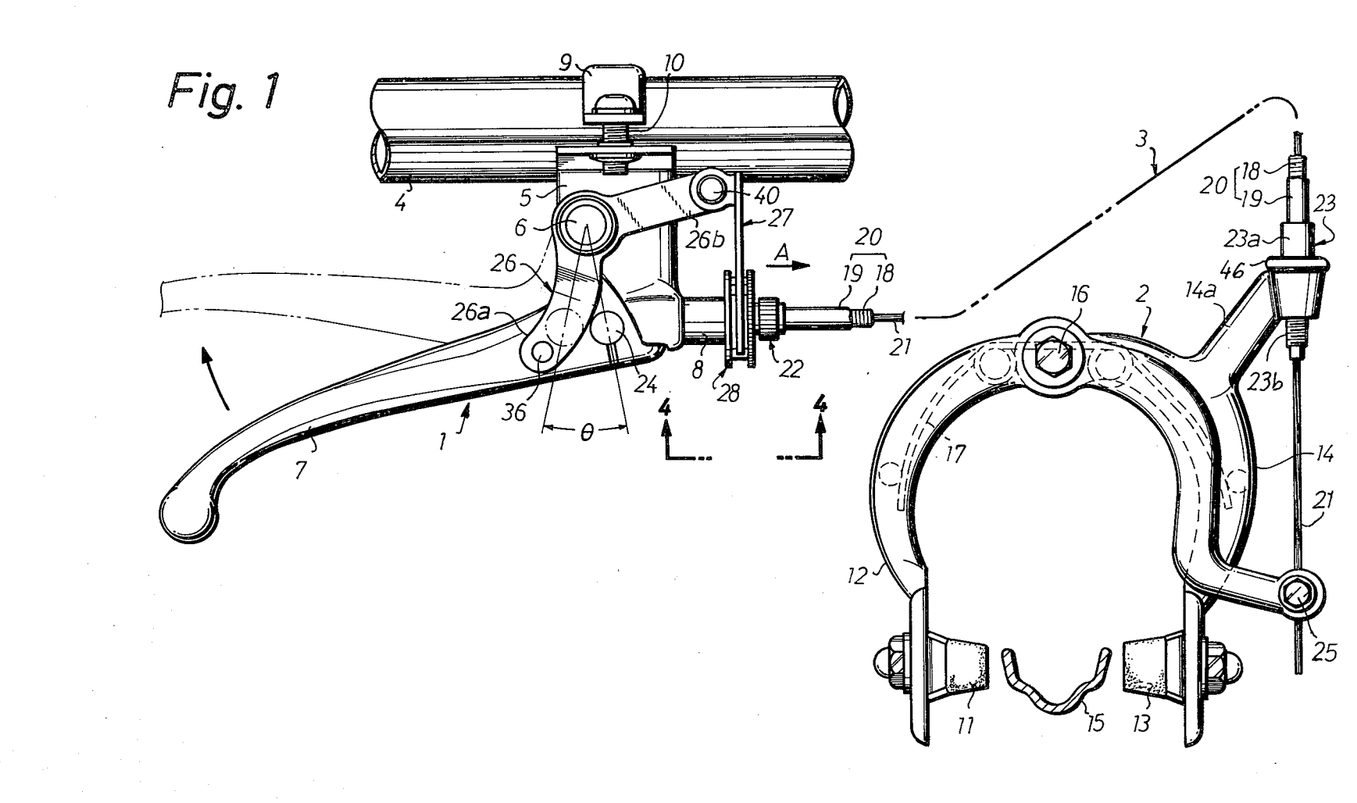
FIG. 1 is a schematic view showing an example of the present invention in its entirety.

Referring to FIG. 1, the present invention is shown applied to a side pull type caliper brake for bicycles. In FIG. 1, the numeral 1 designates brake operating means; 2, brake means for braking the front or rear wheel of a bicycle; and 3 designates a Bowden cable for transmitting the braking force of the brake operating means 1 to the brake means 2. The brake operating means 1 comprises a housing 5 and a brake operating lever 7 pivotally mounted on a pivot shaft 6. Ordinarily, with a cylindrical mouthpiece 8 fitted in an opening in the front lower wall of the housing 5 and directed forwards, the housing 5 is secured in position with its upper end abutting against the underside of a handle bar 4 by means of a bracket 9 and screws 10. In this condition, the brake operating lever 7 has its free end rearwardly and downwardly extended, forming a predetermined angle with the bar 4.

The side pull type caliper brake employed as the brake means 2 comprises a large arch 12 having a brake shoe 11 mounted thereon and a small arch 14 having a brake shoe 13 mounted thereon, said large and small arches 12 and 14 being pivotally mounted on a bolt shaft 16 with said shoes 11 and 13 opposed to a rim 15 of the bicycle, said arches being permanently resiliently urged by a spring 17 in a direction urging the brake shoes away from each other.

The brake means 2 may, of course, be in the form of a center pull type caliper brake, disc brake, cantilever type brake or any other type so long as it brakes a bicycle wheel.

The Bowden cable 3 is composed of an outer sheath 20 in the form of a coiled spring 18 covered with a plastics tube 19 and an inner 21 cable in the form of a stranded wire inserted in the outer sheath 20. The outer sheath 20 has outer sheath receivers 22 and 23 fixed to both ends thereof. The outer sheath receivers 22 and 23, one of which is shown in detail in FIG. 2, comprise enlarged heads 22a and 23a and hollow threaded tubes 22b and 23b, said heads and tubes being made integral with each other. In order to turn the pair of brake shoes 11 and 13 around the axis of the bolt shaft 16 until they are pressed against the rim 15 when the brake operating lever 7 is gripped to be turned around the axis of the pivot shaft 6, the Bowden cable 3 is operatively connected between the brake operating means 1 and the brake means 2 in the following manner.

The hollow threaded tube 22b of one outer sheath receiver 22 is loosely inserted in the cylindrical mouthpiece 8 fitted in the housing 5 and one end of the inner cable 21 inserted in said hollow threaded tube is connected to the brake operating lever 7 through a coupling 24, while the other outer sheath receiver 23 has its hollow threaded tube 23b screwed into the front end portion of arm 14a extending from the small arch 14 and the other end of the inner cable 21 inserted in said hollow threaded tube is fixed to the terminal end of the large arch 12 by a coupling 25.

In the arrangement described above, the present invention incorporates automatic brake adjusting means in the brake operating means 1. The automatic brake adjusting means comprises a transmission member 26 adapted to be swung by the brake operating lever 7, a pawl member 27 adapted to be moved substantially vertically by said transmission member and an adjusting screw member 28 adapted to perform a substantially rotative motion under the action of said pawl member 27.

Figure 2:
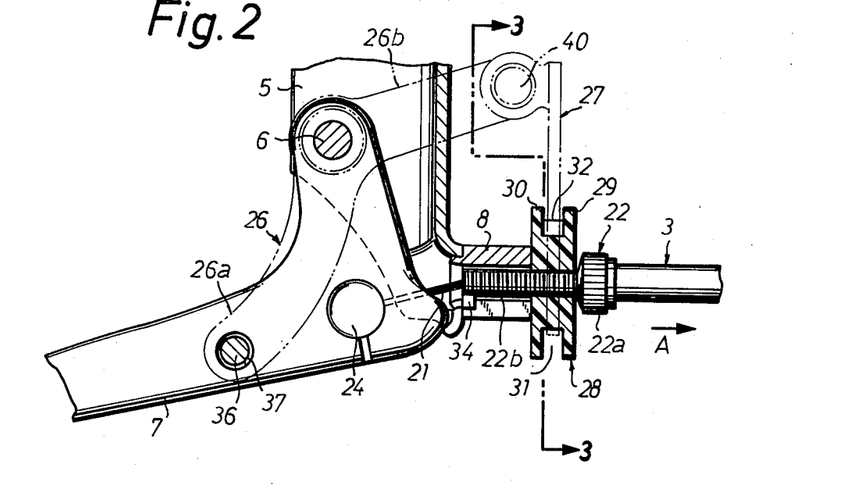
FIG. 2 is a view, partially in section, of the principal portions of the present invention.
Figure 3:
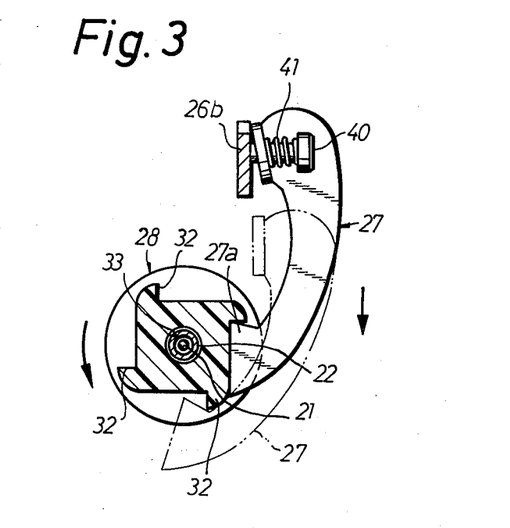
FIG. 3 is a sectional view taken along line 3—3 in FIG. 2.

Referring to FIGS. 2 and 3, the adjusting screw member 28 has a suitable number of teeth 32 around a circumferential groove 31 between opposed flanges 29 and 30 and is centrally formed with a threaded opening 33, into which the hollow threaded tube 22b of said outer sheath receiver 22 is screwed.

The adjusting screw member 28 is held between the cylindrical mouthpiece 8 and the enlarged head 22a of the outer sheath receiver 22 in the initial phase of assembly, as shown in FIG. 2.

The tail end of the hollow threaded tube 22b is formed with a projection 34, which is engaged in an axially extending slot 35 formed in the cylindrical mouthpiece 8. If, therefore, the adjusting screw member 28 is turned in a definite direction, the outer sheath receiver 22 is moved in the direction of arrow A shown in FIG. 2. In this connection, it will be understood that the engagement of the projection 34 with the slit 35 ensures that the outer sheath receiver 22 will be linearly moved without being rotated, by the screw feed action, thereby preventing the outer sheath 20 from being twisted. If a twist of the outer sheath 20 is allowed, the projection 34 engaged in the slit 35 may be omitted and yet said movement of the outer sheath receiver 22 is still possible since the adjusting screw member 28 is permanently urged against the cylindrical mouthpiece 8 by the coiled spring 18 of the Bowden cable 3.

The linear movement of the outer sheath receiver 22 is, of course, advantageous in that it prevents twist of the outer sheath 20, but such preventive means is not limited to a combination of said slit 35 and projection 34, as will be later described.

Figure 6:
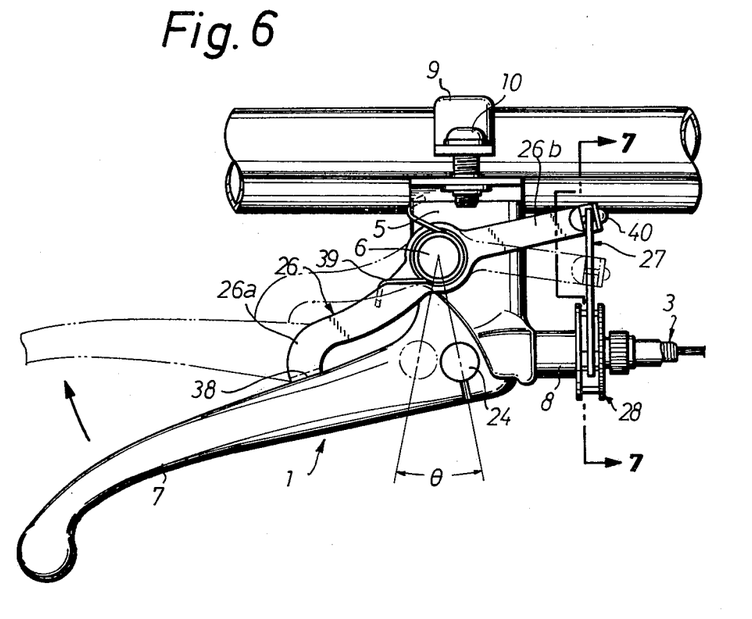
FIG. 6 is a front view showing another example of the present invention.

The transmission member 26 is generally in the form of a bell crank, as shown in FIG. 1, having its intermediate portion pivotally mounted on one lateral wall of the housing 5, preferably the inner lateral wall thereof, by making common use of the pivot shaft 6 of the brake operating lever 7. In a preferred embodiment of the invention, one arm 26a of the transmission member 26 is provided with a pivot pin 36, which is fitted in an opening 37 of slightly larger diameter than said pin formed on the intermediate portion of the adjusting screw member 28, whereby the transmission member is pivotally connected to the latter, the other arm 26b extending generally immediately above the adjusting screw member. Further, in another preferred embodiment of the invention, instead of said one arm 26a of the transmission member 26 being pivotally connected to the brake operating lever 7, it is formed at its end with an abutment 38, as shown in FIG. 6, which is permanently urged against the intermediate portion of the inner side of the brake operating lever 7 by means of a spring 39, while the other arm 26b extends generally immediately above the adjusting screw member 28.

Figure 4:
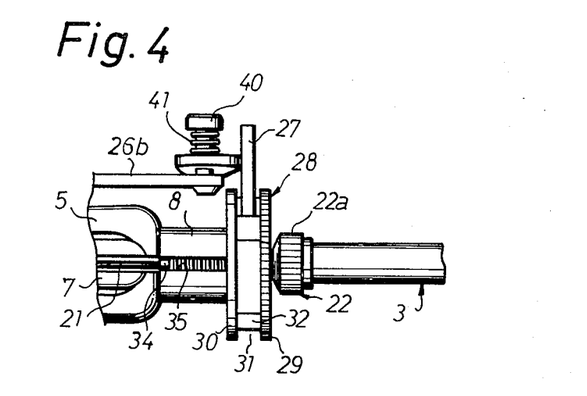
FIG. 4 is an enlarged view taken in the direction of arrow 4—4 in FIG. 1.
Figure 5:
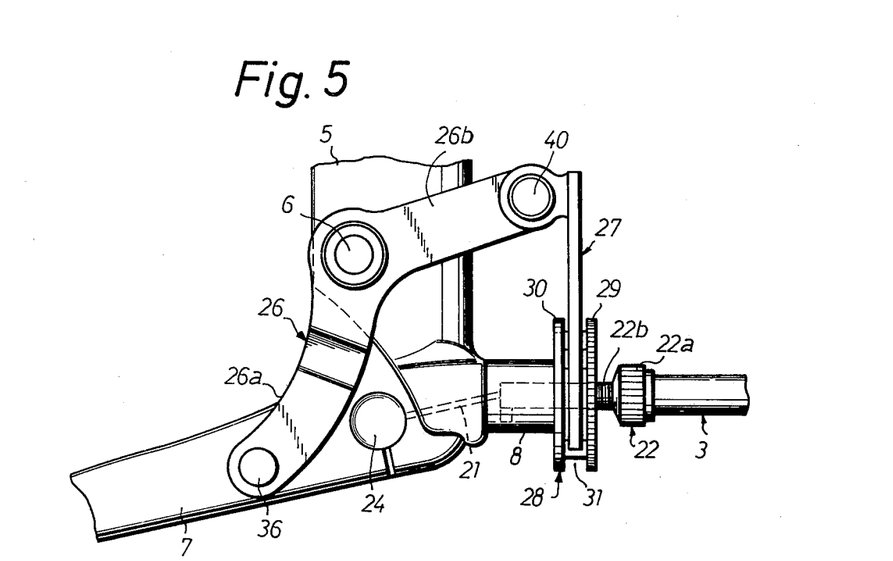
FIG. 5 is a front view showing a portion after adjustment of the brake.

The pawl member 27 having a tooth 27a is pivotally connected to one arm 26b of the transmission member 26 through a pivot pin 40, said pawl member 27 downwardly extending substantially to one side of the circumferential groove 31 of the adjusting screw member 28. In the most preferable embodiment of the present invention shown in FIGS. 1 through 5, such tooth 27a is formed at the lowermost end of the pawl member 27 and engages a tooth 32 of the adjusting screw member 28 from below as shown in FIG. 3. In order to ensure secure engagement between a tooth 32 of the adjusting screw member 28 and the tooth 27a of the pawl member 27, a coiled spring 41 is provided on the pivot pin 40, as shown in FIG. 4, for resiliently urging the pawl member 27 against the adjusting screw member 28. In another embodiment of the invention shown in FIGS. 6 and 7, the intermediate portion of the pawl member 27 pivotally connected to one arm 26b of the transmission member 26 through a pivot pin 40 is formed with a tooth 27a, which is positioned above the teeth 32 of the adjusting screw member 28 without engaging said teeth 32. A bar-like spring 42 resiliently urges the pawl member 27 against the adjusting screw member 28.

If the operating lever 7 of the brake operating means 1 is gripped to be turned around the axis of the pivot shaft 6 against the force of the spring 17 through a predetermined angle of swing $\theta$ as shown in FIG. 1, then, as is known in the art, the pulling force on the inner 21 of the Bowden cable 3 cooperates with the reaction to said pulling force to contract the large and small arches 12 and 14 around the axis of the bolt shaft 16 until the brake shoes 11 and 13 are urged against both sides of the rim 14, thereby making it possible to apply the brakes. Since one arm 26a of the transmission member 26 is pivotally mounted on the intermediate portion of the operating lever 7 through the pivot pin 36 or has its abutment 38 resiliently urged against said lever by the spring 39, the gipping of the operating lever causes the arm 26b of the transmission member 26 to be swung downwardly around the axis of the pivot shaft 6. Since the pawl member 27 having the tooth 27a is suspended from the other arm 26b of the transmission member through the pivot pin 40, the gripping of the operating lever 7 causes the pawl member 27 to be downwardly moved through the intermediary of the transmission member 26. Although the pawl member 27 performs a substantially arcuate motion, it can be swung downwardly without the danger of being disengaged from the circumferential groove 31 of the adjusting screw member 28 because of the fact that the upper end of the pawl member is pivotally connected to one arm 26a of the transmission member 26 through the pivot pin 40, that the pawl member is positioned laterally of the circumferential groove 31 of the adjusting screw member 28 and controlled by the opposed flanges 29 and 30, and that the pawl member is resiliently urged against the circumferential groove 31 of the adjusting screw member 28.

Upon release of the operating lever 7 from said grip action, the lever restores its original position under the action of the coiled spring 17 of the brake means 2, as is known in the art, and simultaneously therewith the pawl member 27 is upwardly swung. During this upward swing, the pawl member 27 is prevented from being disengaged from the circumferential groove 31 of the adjusting screw member 28, for the same reason as that described above.

If the amount the operating lever 7 is swung is less than the angle of swing $\theta$, the pawl member 27 simply swings vertically in the circumferential groove 31 of the adjusting screw member 28 without letting its tooth 27a engage any one of the teeth 32 of the adjusting screw member 28, so that it imparts no torque to the adjusting screw member. Thus, the brake system for bicycles consisting of brake means 2 for braking the associated wheel, brake operating means 1 installed on one or both sides of the handle bar 4, and a Bowden cable 3 for transmitting the gripping force of the brake operating means 1 in a direction in which the brake means 2 applies the brakes, is generally assembled in such a manner that when the operating lever 7 of the brake operating means 1 is gripped through a predetermined angle of swing $\theta$, a braking force is applied to the wheel.

If, however, wear of the brake shoes 11 and 13 and/or elongation of the Bowden cable 3 takes place during use, said pulling force or pushing force on the Bowden cable 3 which is exerted upon gripping of the brake operating lever 7 through said initial angle of swing $\theta$ becomes insufficient, with the result that the brake shoes 11 and 13 cannot be brought into intimate contact with the rim 14, causing a decrease in the braking force or leading to failure to apply the brakes.

When such situation arises, the rider grips of himself the brake operating lever 7 a larger amount than the initial angle of swing $\theta$ (or the so-called gripping depth). If the gripping depth of the brake operating lever 7 becomes larger, then the transmission member 26 is swung a correspondingly larger amount and hence the displacement of the pawl member 27 attached thereto is correspondingly increased. In the embodiment shown in FIGS. 1 through 5, such increase in the displacement of the pawl member 27 causes the adjusting screw member 28 to be turned by the ratcheting action upon upward movement (return stroke) of the pawl member 27, whereby the outer sheath receiver 22 screwed into said adjusting screw member is moved in the direction of arrow A. Further, in the embodiment shown in FIGS. 6 and 7, the adjusting screw member 28 is turned upon the downward movement (advance stroke) of the pawl member 27, so that the outer sheath receiver 22 screwed into the adjusting screw member 28 is moved in the direction of arrow A.

The embodiment shown in FIGS. 1 through 5 will now be described in more detail with reference to FIG. 3. As the gripping depth of the operating lever 7 is increased, the pawl member 27 resiliently urged against the circumferential groove 31 of the adjusting screw member 28 is moved through the transmission member 26 an amount greater than the initial displacement thereof. If such increased displacement is greater than the distance between adjacent teeth of the adjusting screw member 28, then it follows that the tooth 27a of the pawl member 27 engages the next tooth 32 of the adjusting screw member 28, as shown in phantom lines in FIG. 3. This engagement is securely carried out since the pawl member 27 is resiliently urged against the circumferential groove 31 of the adjusting screw member 28. When the operating lever 7 is released from the grip action thereon after engagement between te tooth 27a of the pawl member 27 and the tooth 32 of the adjusting screw member 28, the pawl member 27 is upwardly moved as described above and during this advance stroke the adjusting screw member 28 is turned, during which turning movement also, the engagement between the teeth 27a and 32 is maintained since the pawl member 27 is resiliently urged by the spring 41.

When the adjusting screw member 28 is turned as described above, the outer sheath receiver 22, which is screwed into the threaded opening 33 in the adusting screw member 28 and is constantly urged toward the housing 5 by the outer sheath 20 of the Bowden cable 3, receives a torque whereby it is slightly moved against the compressive force of the outer sheath 20 in the direction A (see FIG. 5) away from adjusting screw member 28. If the projection 34 on the outer sheath receiver 22 is in engagement with the slit 35 of the cylindrical mouthpiece 8 during said slight movement of the outer sheath receiver 22, as described above, then the outer receiver can be securly moved in a linear path without imparting twist to the outer sheath 20. When the outer sheath receiver 22 disposed on the side of the brake operating means 1 is moved in the direction A toward the brake means 2, as described above, this movement is transmitted to the other receiver 23 through the outer sheath 20: In the embodiment shown, the arm 14a of the small arch 14 is depressed and the brake shoes 11 and 13 are moved toward the rim 14 through a distance corresponding to the amount of wear thereof, whereas since the inner cable 21 is free to slide within the outer sheath 20, said movement of the outer sheath 20 in the direction A causes relative movement of the inner cable 21, so that any decrease in the pulling force due to the elengation of the inner is prevented. The result is that the decrease in the braking force provided by the initial gripping depth of the brake operating lever 7 is compensated, so that henceforth the initial gripping depth of the brake operating lever 7 through the angle of swing $\theta$ will provide the necessary braking force.

Figure 7:
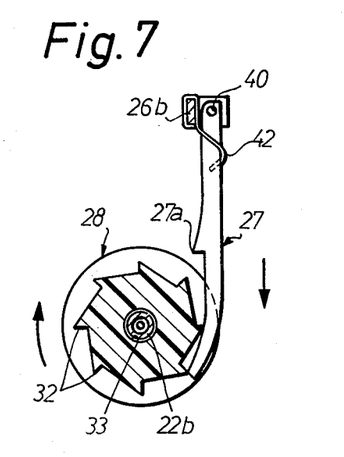
FIG. 7 is a sectional view taken along the line 7—7 in FIG. 6.

In the embodiment shown in FIGS. 6 and 7, if the pawl member 27 resiliently urged against the circumferential groove 31 of the adjusting screw member 28 by the spring 42 as shown in FIG. 7 is downwardly moved an amount greater than the initial displacement by gripping the operating lever 7 an amount greater than the initial angle of swing $\theta$, as described above, the tooth 27a formed in the intermediate portion of the pawl member 27 engages a tooth 32 of the adjusting screw member 28 during the advance stroke thereof to turn the adjusting screw member 28. This turning movement of the adjusting screw member 28 causes the outer sheath receiver 22 to be slightly moved in a linear path by the screw feed means in the direction A away from the adjusting screw member 28, so that the brake shoes 11 and 13 are moved toward the rim 14 an amount corresponding to the amount of wear thereof and at the same time the elongation of the inner 21 of the Bowden cable 3 is taken up through the relative movement incidental to the movement of the outer sheath 20.

In each of the embodiments described above, repeated gripping and release of the brake operating lever 7 for the compensation of the decrease in the braking force causes the linear movement of the outer sheath receiver 22 in the direction A toward the brake means 2, and to the extent that the hollow threaded tube 22b in the outer sheath receiver 22 is finally disengaged from the open end of the cylindrical mouthpiece 8, the decrease in said braking force could be automatically compensated. If, however, the hollow threaded tube 22b is actually disengaged from the cylindrical mouthpiece 8, this not only makes it substantially difficult to grip the brake operating lever 7 but also makes it impossible to transmit the operating force to the brake means 2 through the Bowden cable 3 even if the lever 7 could be gripped. With the bicycle brake adjusting means installed in the brake system as described above, since such adjustment is performed through the rider's unaware gripping of the lever 7, there will be the case in which disengagement of said hollow threaded tube 22a takes place without the knowledge of the rider.

Figure 8:
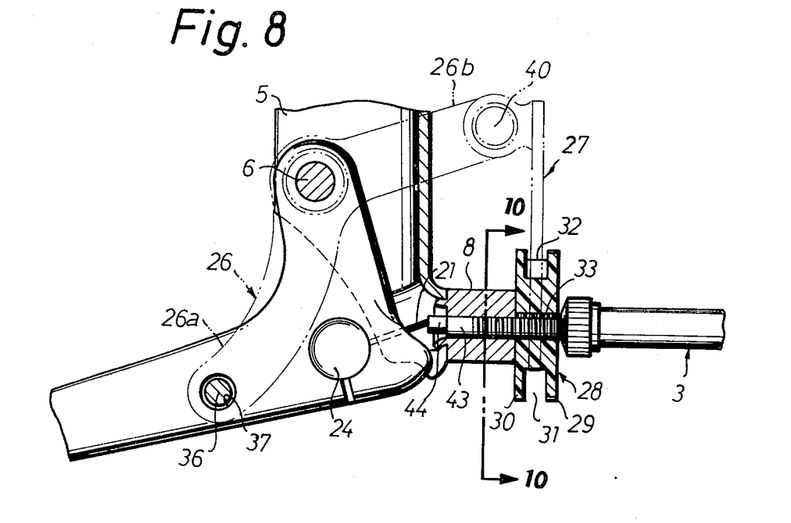
FIG. 8 is a sectional view of the principal portions of still another example of the present invention.
Figure 9:
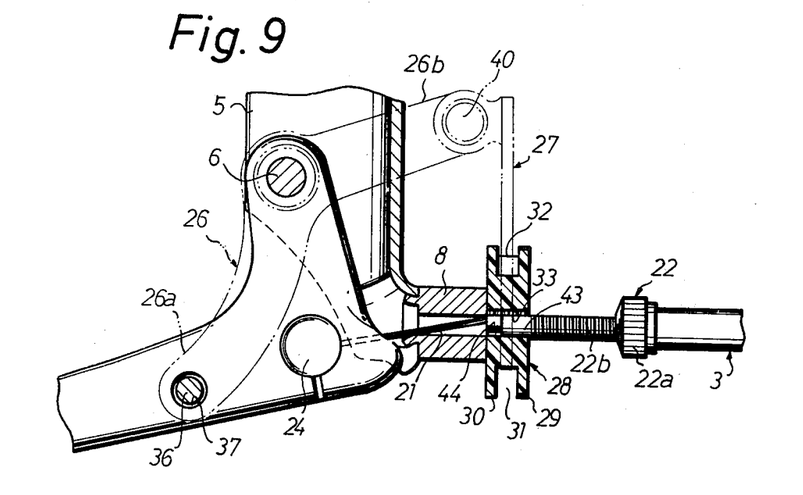
FIG. 9 is a sectional view similar to FIG. 8, but showing a condition established after adjustment of the brake.
Figure 10:
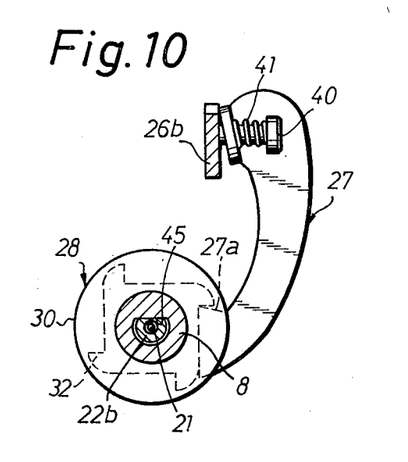
FIG. 10 is a view taken in the direction of arrow 10—10 in FIG. 8.

In order to avoid such drawback, the present invention employs disengagement preventing means as shown in FIGS. 8 through 10. This disengagement preventing means comprises an unthreaded portion 43 formed at the tail end portion of the hollow threaded tube 22b of the outer sheath receiver 22, there being provided a reduced cylindrical portion 44 at the end surface thereof. Thus, when the adjusting screw member 28 is turned continually from the beginning of the use of the device to the last to screw-feed the outer receiver 22 in the direction A toward the brake means 2, the tail end portion including the cylindrical portion 44 of the hollow threaded tube 22b comes to be inserted in the threaded opening 33 in the adjusting screw member 28 so that the adjusting screw member 28 only turns idle, thereby achieving the object. In the embodiment shown in FIGS. 8 through 10, a flat surface 45 is formed on part of the hollow threaded tube 22b while the cylindrical mouthpiece 8 is formed with an opening similar in cross-section to said hollow threaded tube 22b, whereby when the adjusting screw member 28 is turned to screw-feed the outer sheath receiver 22, linear movement of the latter is ensured. In the embodiment shown in FIGS. 8 through 10, there is no need to form a slit such as shown at 35 in the cylindrical mouthpiece 8, and it is only necessary to fit the latter in the opening in the housing 5. Also, there is no need to form a projection such as shown at 34 on the hollow threaded tube 22b of the outer sheath receiver 22.

It will be readily understood by those skilled in the art that such disengagement preventing means of the outer sheath receiver 22 may be applied to the other outer sheath receiver 23.

In addition, when the brake shoes 11 and 13 have been worn out or the Bowden cable 3 has been completely elongated to the extent that brake adjustment is no longer possible, it goes without saying that the worn-out brake shoes must be replaced by new ones and that the outer sheath receiver 22 must be returned to its original position where its head 22a touches the outer side of the associated flange 29 of the adjusting screw member 28. In that case, with pawl member 27 held disengaged from the circumferential groove 31 of the adjusting screw member 28 against the force of the spring 41 or 42, by rotating the adjusting screw member 28 in a direction opposite to that for adjustment and at the same time rotating the adjusting screw member 46 into which the outer sheath receiver 23 is screwed, it is possible to retract the outer sheath receivers 22 and 23 by the screw feed action with ease. In order to facilitate this operation, at least one of the flanges 29 and 30, or the flange 29, of the adjusting screw member 28 made, for example, of rigid nylon resin may advantageously be knurled. After general adjustment of the clearances between the new shoes 11, 13 and the rim 14, respectively, through the adjusting screw member 46 following the replacement of the worn-out brake shoes 11 and 13 in the manner described above, it is possible to make fine adjustments by gripping the operating lever 7 as in the preceding case.

While a full understanding may be had from what has been described thus far, the following improvements are optional.

In the embodiment shown in FIGS. 1 through 5, if the transmission member 26 and the brake operating lever 7 are pivotally mounted on different shafts rather than on a common shaft, the opening in the operating lever 7 in which a pin 36 on the transmission member 26 is received may be elongated or enlarged as shown at 37 in FIG. 2.

With the pin 36 of the transmission member received with a sufficient play in this manner, it is ensured that the gripping of the operating lever will proceed smoothly without the possibility of one arm 26a of the transmission member 26 interfering with the pivotal movement of the operating lever 7.

Further, the present invention may be embodied by fixing the transmission member 26 to the lateral surface of the operating lever 7 and extending said transmission member without pivotally mounting it on the housing 5, while pivotally mounting on the extended end thereof the pawl member 27 having the tooth 27a.

For a further understanding of the invention, merits thereof are summarized below.

If the braking force is decreased as a result of wear of the brake shoes 11 and 13 and/or elongation of the Bowden cable 3, the gripping depth of the brake operating lever 7 is increased. As the gripping depth of the brake operating lever 7 is on the increase, the transmission member 26 is swung to cause the up-and-down movement of the pawl member 27 having the tooth 27a. Since the pawl member 27 is resiliently urged against the circumferential groove 31 of the adjusting screw member 28 having the teeth 32, the up-and-down movement of the pawl member 27 causes the turning movement of the adjusting screw member 28, thereby screwfeeding the outer sheath receiver 22 toward the brake operating means 2. The net result is that the spacings between the rim 14 and the brake shoes 11, 13, respectively, are corrected. Thus, the cause of the decrease in the braking force has been corrected automatically and in the proper amount by the gripping force on the brake operating lever 7, thereby saving the necessity for manual troublesome brake adjustment.

In the case where brake adjustment is made during the advance stroke of the pawl member 27 as in the embodiment shown in FIGS. 6 and 7, such adjustment becomes possible upon gripping of the brake operating lever 7, so that rapid adjustment can be achieved. On the other hand, where brake adjustment is made during the return stroke of the pawl member 27 and one end of the transmission member 26 is pivotally connected to the brake operating lever 7 as in the embodiment shown in FIGS. 1 through 5, detachment of the transmission member 26 and deviation of the pawl member 27 can be prevented even if the bicycle is subjected to vibration when running on a bad road.

Particularly, when the automatic adjusting means of the ratchet mechanism type is employed which comprises a combination of the adjusting screw member 28 of ratchet wheel construction having a suitable number of teeth 32 around the circumferential groove 31 thereof, and the swingable transmission member 26 having pivotally connected to one end thereof a pawl member 27 having a tooth 27a engageable with said teeth 32, the increase in the gripping depth of the brake operating lever 7 can be securely and accurately reflected as a displacement of the outer receiver 22 toward the brake means 2. Moreover, the automatic adjusting means comprising the transmission member 26, pawl member 27, adjusting screw member 28 and outer receiver 22 may be installed in any existing bicycle brake systems without the necessity of substantially remodeling their brake operating levers 7 and housings 5. Thus, it can be applied with great ease and economy.

Since the automatic brake adjusting means is provided in the brake operating means 1, the application thereof is not limited to the side pull type caliper brake illustrated in the drawings, but it may equally be applied to the center pull type caliper brake, hand brake, disc brake, cantilever type brake, etc. Further, according to the present invention, upon completion of brake adjustment, the brake operating lever 7 is restored to its original position without fail, thus causing no change of its positional relation to the handle bar 4, so that there is no danger of adversely affecting the rider's grip action on the brake operating lever 7. By locating said automatic brake adjusting means on the inner surface of the housing 5, the transmission member 26 and pawl member 27 can be prevented from being disconnected as when the bicycle topples. Additionally, it is possible for the rider to view the movements of the pawl member 27 and other parts while riding his bicycle. It is particularly advantageous to install the present device on the inner surface of the housing 5 in that the means for preventing the disengagement of the outer sheath receiver 22 illustrated in FIGS. 8 through 10 can be viewed.

What is claimed is:

1. An automatic brake adjusting device for use with a bicycle brake system comprising brake operating means including a housing secured to a handlebar, and a brake operating lever grippably secured to said housing; brake means for braking the associated bicycle wheel; and a Bowden cable for transmitting the gripping force on said brake operating lever in a direction in which the brake means acts to apply the brakes, said Bowden cable including an inner cable portion and an outer sheath portion which operatively interconnects said brake means and said brake operating means, said device being chracterized in the use of an automatic brake adjusting means for bicycles comprising a transmission member operatively connected to said operating lever, an adjusting screw member adapted to be turned through the intermediary of said transmission member, and an outer sheath receiver screwed into said adjusting screw member being installed in the brake operating means, the arrangement being such that when the gripping depth of the brake operating lever is increased, the adjusting screw member is turned to cause the outer receiver screwed thereinto to be automatically moved in the brake applying direction.

2. An automatic brake adjusting device for bicycles as set forth in claim 1, characterized in that the turning movement of the adjusting screw member caused through the intermediary of the transmission member is effected by a ratchet mechanism.

3. An automatic brake adjusting device for bicycles as set forth in claim 1, wherein the automatic brake adjusting means, has its outer receiver, when automatically moved in the brake applying direction, adapted to be moved linearly without being turned.

4. An automatic brake adjusting device for bicycles as set forth in claim 1, wherein the automatic brake adjusting means, has its outer receiver provided with means for preventing the outer sheath receiver from being disengaged from the adjusting screw member when the outer sheath receiver is automatically moved in the brake applying direction.

5. An automatic brake adjusting device for use with a bicycle brake system comprising brake operating means including a housing secured to a handlebar, and a brake operating lever grippably secured to said housing; brake means for braking the associated bicycle wheel; and a Bowden cable for transmitting the gripping force on the brake operating lever in a direction in which the brake acts to apply the brakes, said Bowden cable including an inner cable portion and an outer sheath portion which operatively interconnect said brake means and said brake operating means, said device being characterized in that it comprises an adjusting screw member centrally formed with a threaded opening and a suitable number of teeth disposed around the circumferential groove thereof, said outer sheath receiver being screwed into said threaded opening, a transmission member pivotally mounted on one lateral wall of said housing and having one end thereof resiliently urged against the intermediate portion of the brake operating lever, a pawl member having a tooth and pivotally connected to the other end of said transmission member, the tooth-formed side of said pawl member being resiliently urged against the circumferential groove of the adjusting screw member, the arrangement being such that when the gripping depth of the brake operating lever is increased, the swinging motion of the transmission member is converted into the turning movement of the adjusting screw member through the pawl member, thereby automatically moving the outer sheath receiver screwed into said adjusting screw member in the brake applying direction.

6. An automatic brake adjusting device for bicycles as set forth in claim 5, wherein the transmission member pivotally mounted on one lateral wall of the housing and having pivotally connected to one end thereof the pawl member with the tooth is pivotally connected at the other end thereof directly to the intermediate portion of the brake operating lever.

7. An automatic brake adjusting device for bicycles as set forth in claim 5, wherein the brake operating lever grippably secured to the housing, and the swingable transmission member operatively connected to said brake operating lever are pivotally mounted on a common shaft.

8. An automatic brake adjusting device for bicycles as set forth in claim 6, wherein the brake operating lever grippably secured to the housing, and the swingable transmission member operatively connected to said brake operating lever are pivotally mounted on a common shaft.

9. An automatic brake adjusting device for bicycles as set forth in claim 5, wherein the swingable transmission member operatively connected to the brake operating lever, and the pawl member having the tooth and pivotally connected to said transmission member are provided on the inner wall of the housing.

10. An automatic brake adjusting device for bicycles as set forth in claim 6, wherein the swingable transmission member operatively connected to the brake operating lever, and the pawl member having the tooth and pivotally connected to said transmission member are provided on the inner wall of the housing.

11. An automatic brake adjusting device for use with a bicycle brake system comprising brake operating means including a housing secured to a handle bar, and a brake operating lever grippably secured to said housing; brake means for braking the associated bicycle wheel; and a Bowden cable for transmitting the gripping force on said brake operating lever in a direction in which the brake means acts to apply the brakes, said Bowden cable including an inner cable portion and an outer sheath portion which operatively interconnect said brake means and said brake operating means, said device being characterized in that it comprises an adjusting screw member having a suitable number of teeth around a circumferential groove therein and an internally threaded central opening, a sheath receiver screwed into said threaded opening, a transmission member pivotally mounted on a lateral wall of said housing and pivotally connected at one end thereof to an intermediate portion of said brake operating lever and carrying at the other end thereof a pivotal pawl member having a tooth, said pawl member being resiliently urged against the circumferential groove at all times, the arrangement being such that when the gripping depth of the brake operating lever is increased, the swinging movement of the transmission member is changed into the rotative movement of the adjusting screw member, said rotative movement causing the sheath receiver screwed into said adjusting screw member to be automatically moved toward the brake means.

12. An automatic brake adjusting device for bicycles as set forth in claim 11, wherein when the sheath receiver is automatically moved toward the brake means, the sheath receiver is moved linearly without being rotated.

13. An automatic brake adjusting device for bicycles as set forth in claim 11, including means for preventing the sheath receiver from being disengaged from the adjusting screw member when it is automatically moved toward the brake means.

14. An automatic brake adjusting device for bicycles as set forth in claim 11, wherein the brake operating lever and the transmission member are externally mounted on the housing by using a common pivot.

15. An automatic brake adjusting device for bicycles as set forth in claim 11, wherein the brake operating lever and the transmission member operatively connected thereto are externally mounted on an inner lateral wall of the housing.

* * * * *